United States Patent
Archeny et al.

(10) Patent No.: US 11,203,457 B2
(45) Date of Patent: Dec. 21, 2021

(54) BLOW MOLDED PLASTIC CONTAINER WITH INTEGRATED SPOUT

(71) Applicant: GRAHAM PACKAGING COMPANY, L.P., Lancaster, PA (US)

(72) Inventors: Armel Archeny, Briord (FR); David Araujo, Jassans Riottier (FR); Gilles Rapet, Vertrieu (FR)

(73) Assignee: GRAHAM PACKAGING COMPANY, L.P., Lancaster, PA (US)

( * ) Notice: Subject to any disclaimer, the term of this patent is extended or adjusted under 35 U.S.C. 154(b) by 268 days.

(21) Appl. No.: 16/185,708

(22) Filed: Nov. 9, 2018

(65) Prior Publication Data

US 2020/0148407 A1    May 14, 2020

(51) Int. Cl.
*B29C 49/42* (2006.01)
*B65D 1/02* (2006.01)
*B65D 25/42* (2006.01)
*B29L 31/00* (2006.01)

(52) U.S. Cl.
CPC ........ *B65D 1/0246* (2013.01); *B29C 49/4273* (2013.01); *B65D 25/42* (2013.01); *B29L 2031/7158* (2013.01)

(58) Field of Classification Search
None
See application file for complete search history.

(56) References Cited

U.S. PATENT DOCUMENTS

| | | | |
|---|---|---|---|
| 2,035,877 A | 3/1936 | Geerlings | |
| 5,881,894 A | 3/1999 | Gargano | |
| 6,085,949 A * | 7/2000 | Zimny | B65D 1/023 222/564 |
| 6,228,317 B1 * | 5/2001 | Smith | B65D 1/0223 264/521 |
| 6,460,726 B1 | 10/2002 | Hierzer et al. | |

(Continued)

FOREIGN PATENT DOCUMENTS

WO    WO 2004/065249 A1    8/2004

OTHER PUBLICATIONS

International Search Report dated Jan. 24, 2018 in International Application No. PCT/US17/58988.

*Primary Examiner* — Monica A Huson
(74) *Attorney, Agent, or Firm* — Stradley Ronon Stevens and Young, LLP

(57) ABSTRACT

Method of making a blow-molded plastic container comprises forming a hollow blow-molded article comprising a main body portion defining an interior space, a finish portion defining a mouth in fluid communication with the interior space, the finish portion having a substantially cylindrical circumferential wall of generally uniform thickness surrounding the mouth, the circumferential wall having an upper edge with a perimeter flange and a pair of tabs projecting radially inward from the circumferential wall, the pair of tabs defining a spout therebetween, and a moil portion extending from the perimeter flange in a direction opposite the main body portion. Method further includes inflating the plastic material within the mold cavity to form the hollow blow-molded article and removing the moil portion from the perimeter flange. Blow-molded plastic container having a finish portion with directional pour spout and blow-molded article comprising container and moil portion also disclosed.

8 Claims, 12 Drawing Sheets

(56) References Cited

U.S. PATENT DOCUMENTS

| | | |
|---|---|---|
| 9,108,757 B2 | 8/2015 | Paredes et al. |
| 9,656,772 B2 | 5/2017 | Brozell et al. |
| 2002/0195471 A1 | 12/2002 | Nottingham et al. |
| 2007/0241141 A1 | 10/2007 | Maki et al. |
| 2010/0213211 A1 | 8/2010 | Whaling et al. |
| 2011/0204099 A1 | 8/2011 | Piscopo et al. |
| 2013/0105432 A1 | 5/2013 | Paredes et al. |
| 2017/0203879 A1 | 7/2017 | Brozell et al. |

* cited by examiner

BLOW MOLDED PLASTIC CONTAINER WITH INTEGRATED SPOUT

FIELD OF THE DISCLOSED SUBJECT MATTER

The disclosed subject matter relates to plastic containers having directional pour designs including integrated spouts.

DESCRIPTION OF THE RELATED ART

Plastic containers are well known and widely used for a variety of applications, including the storage, shipment, and sale of various fluid or flowable products. Such plastic containers provide numerous advantages over containers made of glass, metals and/or composites. In many applications, it can be desirable to provide directional pour capability to allow a fluid or similar flowable product to flow from the container in a defined direction toward a desirable location, such as a dose cup. Such fluids or flowable products can include medicines, beverages, personal hygiene products, beauty products, and household and industrial cleaning liquids, including detergents, solvents, disinfectants, and polishes. Traditionally, a separate spout component is needed and assembled to the container or bottle to provide such directional pour capability, which adds operations and cost to the package. Therefore, it can be desirable to provide a plastic container that can be manufactured and/or assembled with an integrated directional pour spout to reduce manufacture operations and costs.

Furthermore, containers for fluid or flowable products often must be sealed, such as by a foam liner along the seam and/or mouth of the container to prevent leakage. Traditional compression foam liners can leak over time, particularly if such containers are not positioned upright. This issue is particularly relevant with the advent of individual sales (e.g., online sales), wherein packages often may not be maintained in an upright position, resulting in leakage during handling and shipping. Furthermore, containers with spouts often are difficult or incapable to be securely sealed due to the overall contour of the spout. Therefore, it can be desirable to provide a container with directional pour that is capable of being sealed and will hold up to shipping and handling conditions.

There thus remains a continued need for improved containers with directional pour capability for dispensing a fluid or similar flowable product. There further remains a need for such containers that can allow for robust sealing to prevent leaking during shipping and handling.

SUMMARY OF THE DISCLOSED SUBJECT MATTER

The purpose and advantages of the disclosed subject matter will be set forth in and are apparent from the description that follows, as well as will be learned by practice of the disclosed subject matter. Additional advantages of the disclosed subject matter will be realized and attained by the subject matter particularly pointed out in the written description and claims hereof, as well as from the appended drawings.

To achieve these and other advantages and in accordance with the purpose of the disclosed subject matter, as embodied herein and broadly described, the disclosed subject matter includes a method of making a blow-molded plastic container, comprising disposing a plastic material suitable for a blow molding process in a mold cavity configured to form a hollow article, inflating the plastic material within the mold cavity to form the hollow article, and removing a moil portion of the hollow article. The hollow article comprises a main body portion defining an interior space, a finish portion defining a mouth in fluid communication with the interior space, and a moil portion. The finish portion has a substantially cylindrical circumferential wall of generally uniform thickness surrounding the mouth, and the circumferential wall has an upper edge with a perimeter flange and a pair of tabs projecting radially inward from the circumferential wall, with the pair of tabs defining a spout therebetween. The moil portion extends from the perimeter flange in a direction opposite the main body portion, before it is removed therefrom.

As embodied herein, the tabs can have a variety of suitable configurations. For example, the tabs can extend within a plane defined by the perimeter flange. Furthermore, the tabs can also be arcuate in plan view. Additionally, the tabs can be spaced apart at least 10 degrees about the perimeter edge to define the spout therebetween.

As embodied herein, removing the moil can comprise cutting between the perimeter flange and the moil portion to form a perimeter edge. As embodied herein, removing the moil can comprise cutting between the perimeter flange and the moil portion to form a perimeter edge having a bevel angled between about 0 and about 10 degrees from a plane defined by the perimeter flange.

Additionally, or alternatively, removing the moil can comprise cutting at a distance spaced from the perimeter flange in the direction opposite the main body portion to create a lip extending upwardly from the perimeter flange and the pair of tabs. In this manner, removing the moil can comprise cutting between the lip and the moil along a plane parallel to the plane defined by the perimeter flange. Additionally, or alternately, removing the moil can comprise cutting between the lip and the moil portion to form a planar perimeter edge having a bevel angled between about 0 and about 10 degrees from the plane defined by the planar perimeter edge.

Furthermore, and in accordance with the disclosed subject matter, the circumferential wall can comprise a fastener for fastening a cap to the finish portion.

In accordance with another aspect of the disclosed subject matter, a plastic container is provided comprising a main body portion defining an interior space, and a finish portion defining a mouth in fluid communication with the interior space. The finish portion has a substantially cylindrical circumferential wall of generally uniform thickness surrounding the mouth, the circumferential wall having an upper edge with a perimeter flange and a pair of tabs projecting radially inward from the circumferential wall, the pair of tabs defining a spout therebetween. The blow-molded plastic container of the disclosed subject matter is made by disposing a plastic material suitable for a blow molding process within a mold cavity, the mold cavity being configured to from a hollow blow-molded article comprising the main body portion, and the finish portion as described with a moil portion extending from the perimeter flange in a direction opposite the main body portion. The blow-molded plastic container is made by further inflating the plastic material within the mold cavity, and removing the moil.

Further in accordance with the disclosed subject matter, a hollow blow-molded plastic article is provided for making a blow-molded plastic container, comprising a main body portion defining an interior space, and a finish portion defining a mouth in fluid communication with the interior space. The finish portion has a substantially cylindrical circumferential wall of generally uniform thickness surrounding the mouth, the circumferential wall has an upper edge with a perimeter flange and a pair of tabs projecting radially inward from the circumferential wall, and the pair of tabs defines a spout therebetween. The hollow blow-molded plastic article further comprises a moil portion extending from the perimeter flange in a direction opposite the main body portion.

It is to be understood that both the foregoing general description and the following detailed description and drawings are examples and are provided for purpose of illustration and are not intended to limit the scope of the disclosed subject matter in any manner.

The accompanying drawings, which are incorporated in and constitute part of this specification, are included to illustrate and provide a further understanding of the devices of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which.

DETAILED DESCRIPTION

Figure 1:
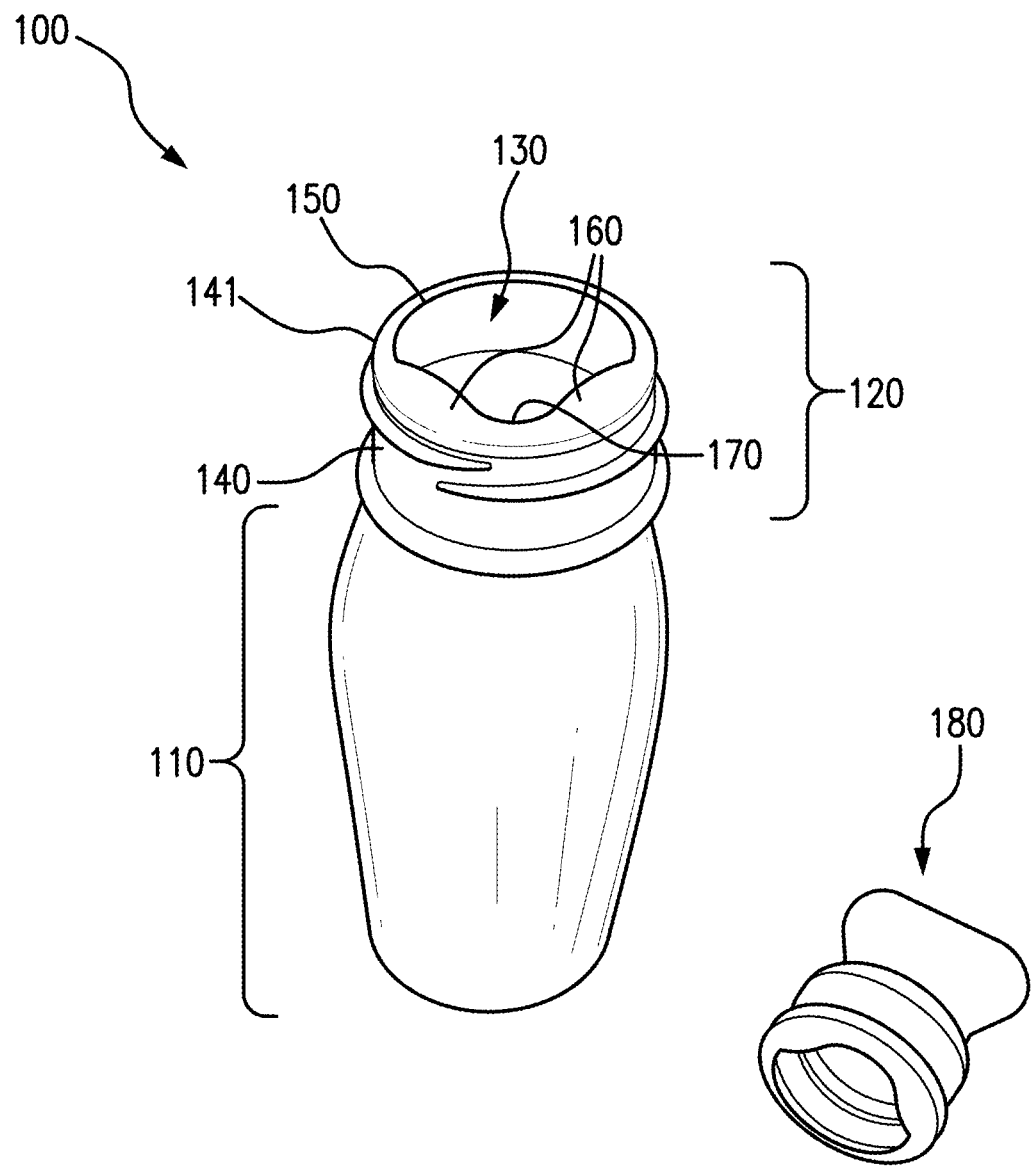
FIG. 1 is a top perspective view of an exemplary plastic container made from a hollow blow-molded article in accordance with the disclosed subject matter, with the moil portion removed.

Reference will now be made in detail to the disclosed subject matter, examples of which are illustrated in the accompanying drawings. Particularly, the disclosed subject matter will be described in conjunction with a detailed description of the method and system for making a plastic container having a directional pour spout made from a hollow blow-molded plastic article.

As disclosed herein, plastic containers disclosed herein can be used to provide directional pour to dispense a fluid or flowable product in a defined direction toward a desirable location, e.g., to a dose cup. Such fluids or flowable products can include medicines, beverages, personal hygiene products, beauty products, and household and industrial cleaning products, including detergents, solvents, disinfectants, and polishes. The plastic containers disclosed herein can also be used for storing such product when closed and sealed for shipping and handling with little or no leakage from the finish portion while still providing a desired directional pour when opened and in use. The containers disclosed herein have a finish portion with an integral directional pour spout and a generally planar surface or edge about the entirety of a top perimeter so as to allow a seal to be provided thereto. The container can further include ergonomic features to provide an easy removal of the seal.

In accordance with the disclosed subject matter, a method of making a blow-molded plastic container having an integral directional pour spout, and a hollow blow-molded article for making such a plastic container are provided. The plastic container of the disclosed subject matter includes a main body portion defining an interior space, and a finish portion defining a mouth in fluid communication with the interior space. The finish portion has a substantially cylindrical circumferential wall of generally uniform thickness surrounding the mouth, wherein the circumferential wall has an upper edge with a perimeter flange and a pair of tabs projecting radially inward from the circumferential wall. The pair of tabs define a spout therebetween. To make the plastic container of the disclosed subject matter, a hollow blow-molded article is formed comprising the main body portion and the finish portion of the plastic container, and further comprising a moil portion extending from the perimeter flange in a direction opposite the main body portion.

The method of the disclosed subject matter comprises disposing a plastic material suitable for a blow molding process within a mold cavity configured to form a hollow blow-molded article comprising a main body portion defining an interior space, and a finish portion defining a mouth in fluid communication with the interior space. The finish portion has a substantially cylindrical circumferential wall of generally uniform thickness surrounding the mouth, wherein the circumferential wall has an upper edge with a perimeter flange and a pair of tabs projecting radially inward from the circumferential wall. The pair of tabs define a spout therebetween. Additionally, the hollow blow-molded article formed by the mold cavity has a moil portion extending from the perimeter flange in a direction opposite the main body portion. The method further comprises inflating the plastic material within the mold cavity to form the hollow article, and removing the moil portion from the perimeter flange.

For purpose of understanding, and in accordance with another aspect of the disclosed subject matter, reference is made to an exemplary embodiment made by the method disclosed herein. For purpose of illustration and not limitation, FIG. 1 shows a plastic container 100, made in accordance with the disclosed subject matter, including a main body portion 110 defining an interior space, and a finish portion 120 defining a mouth 130 in fluid communication with the interior space, wherein the finish portion 120 is unitary with the main body portion 110 and a spout 170 is unitary with the finish portion 120. In this manner, manufacturing operations, and the materials costs can be reduced. As used herein, the term "unitary" is intended to mean formed as a single piece such as by blow molding or the like.

Figure 2:
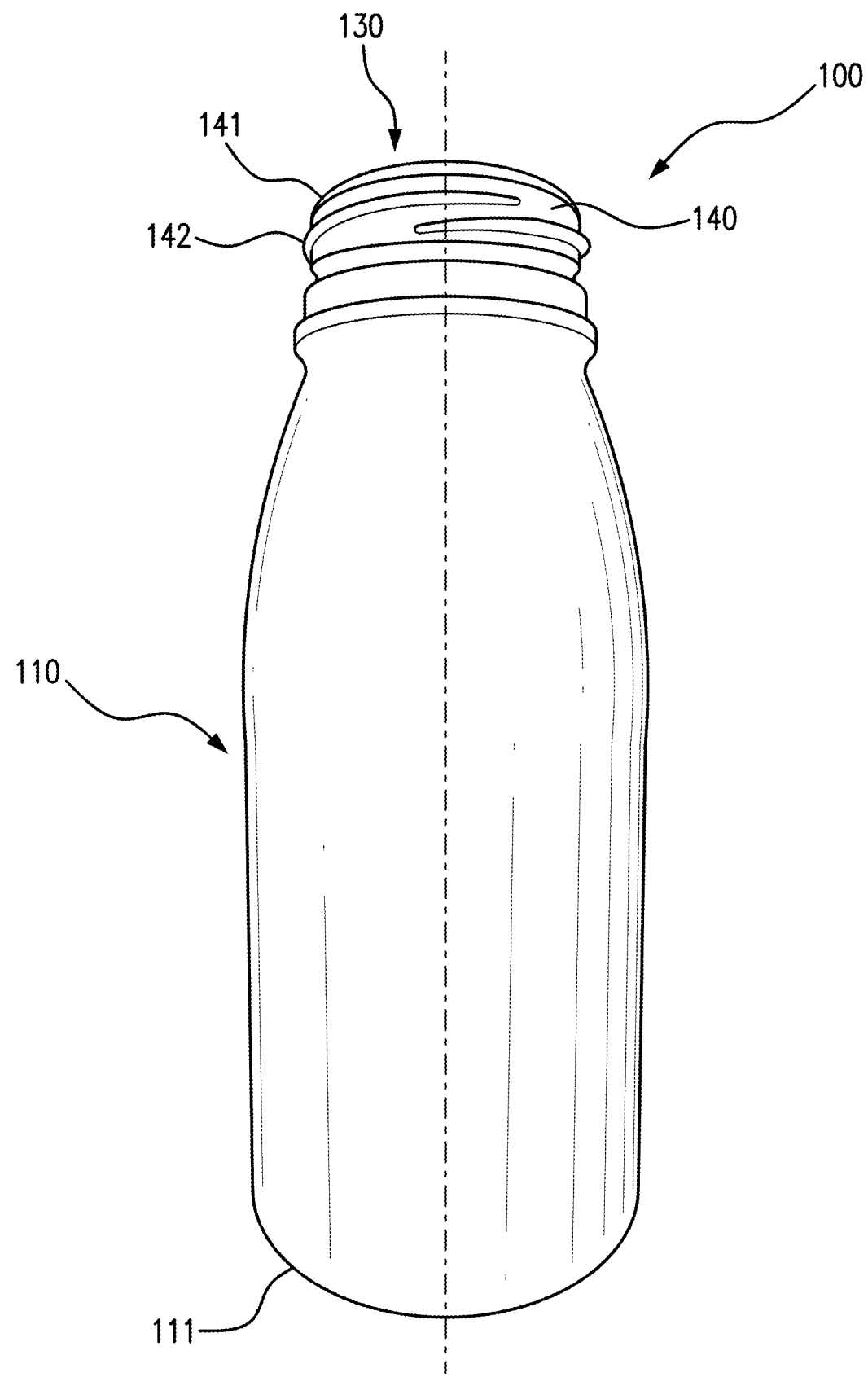
FIG. 2 is a side view of the exemplary plastic container of FIG. 1 made in accordance with the disclosed subject matter.
Figure 3:
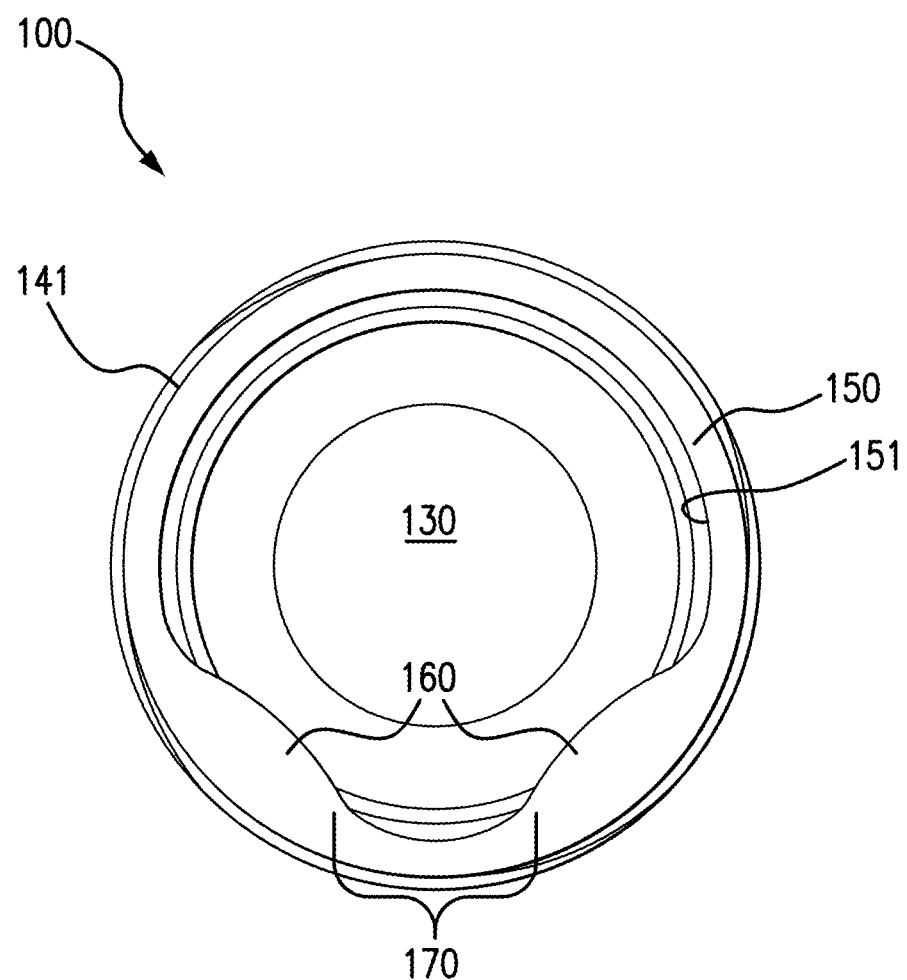
FIG. 3 is a top view of the exemplary plastic container of FIG. 1 made in accordance with the disclosed subject matter.
Figure 4:
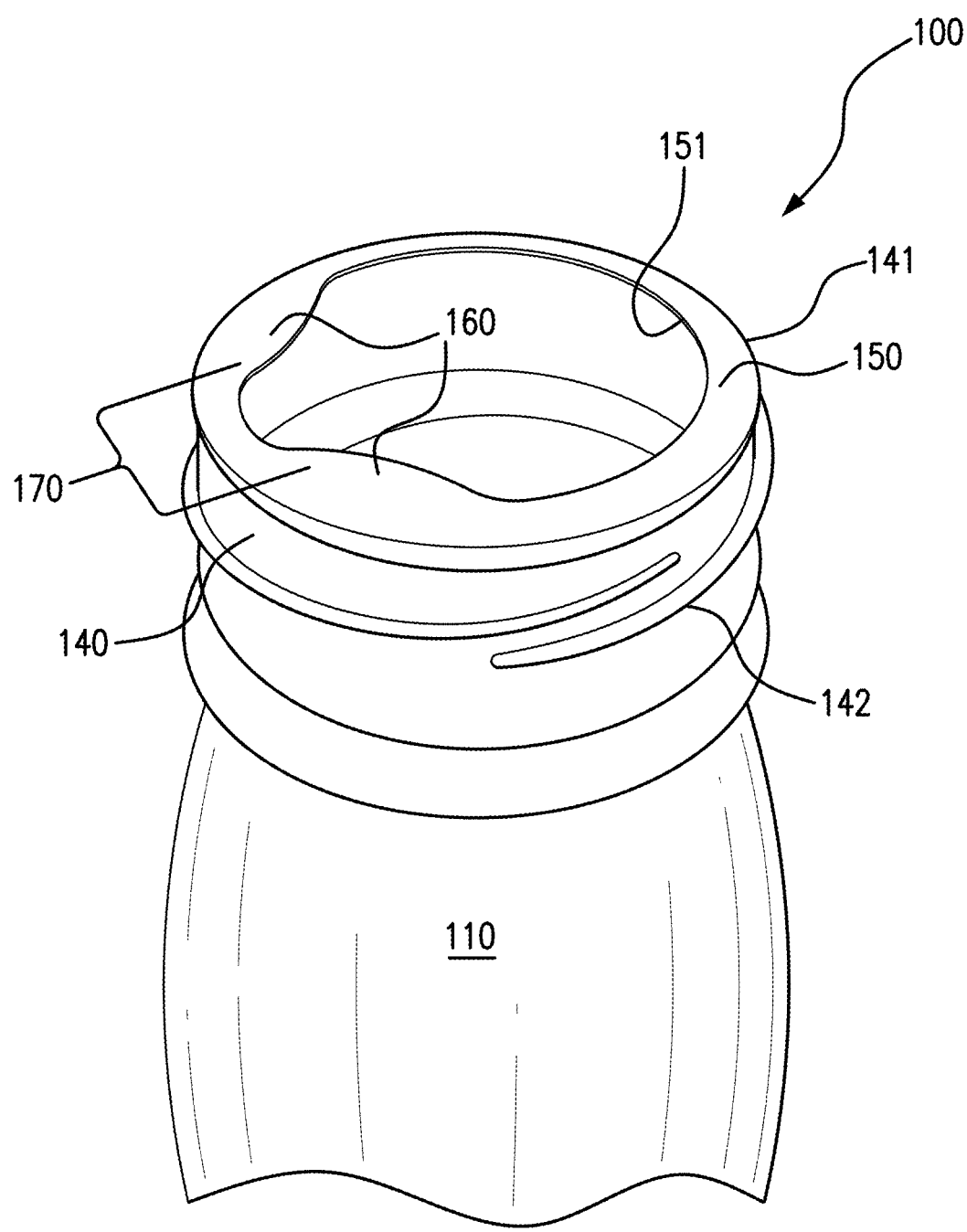
FIG. 4 is an enlarged top perspective view of the exemplary plastic container of FIG. 1 made in accordance with the disclosed subject matter.

FIGS. 2-4 provide alternate views of the exemplary container 100 depicted in FIG. 1 for purpose of illustration and not limitation. The main body portion 110 of container 100 can define a longitudinal axis a.

Any suitable size and shape of main body portion 110 can be used in accordance with the disclosed subject matter. For example, the main body portion can be of a size capable of holding a desired amount of fluid or flowable product. For purpose of illustration and not limitation, the main body portion can be configured to hold, for example, 12 ounces, 24 ounces, 36 ounces, one gallon, or other amounts. Furthermore, in accordance with the disclosed subject matter, the main body portion can be of various suitable or desired shapes. For example, and for purpose of illustration and not limitation, the main body portion can be generally shaped as any suitable shape, such as an ovoid, prism, or the like. As will be understood by one skilled in the art, a main body portion shaped generally as a prism can have a base of a generally circular, ellipsoidal, rectangular, polygonal, or other shape. Additionally, the main body portion can comprise an upper portion, such as a dome or the like, a base portion, a handle portion, and/or other portions or features as known in the art. Furthermore, the main body portion can include structural features known in the art, such as ribs, radiused portions, grooves, vacuum panels, and the like. Thus, the main body portion of the container made in accordance with the disclosed subject matter can have a wide variety of suitable sizes and shapes.

As embodied herein, the finish portion 120 has a substantially cylindrical circumferential wall 140 of generally uniform thickness surrounding the mouth 130. For example, as understood by those skilled in the art, a conventional blow molding process can produce containers having a generally uniform thickness, with features and contours thereof being formed of material of the same generally-uniform thickness. In this manner, the circumferential wall 140 has an upper edge 141 with a perimeter flange 150 and a pair of tabs 160 projecting radially inward from the circumferential wall 140. The pair of tabs 160 are configured to define the spout 170 therebetween. If desired, however, a container of generally uniform thickness can be provided wherein selected features can be provided with a different thickness, for example features having a greater thickness can be formed and/or attached to a container portion having generally uniform thickness for stiffness or support. As used herein, the "generally uniform thickness" of the circumferential wall therefore refers to the circumferential wall, and not necessarily the thickness or effective thickness of any fasteners or features thereon.

With reference to FIG. 3, the circumferential wall 140 is substantially cylindrical. For example, as embodied herein, the circumferential wall has a circular shape in plan view. However, other suitable shapes can be used for the circumferential wall if desired, such as elliptical, oval, or the like.

Further in accordance with the disclosed subject matter, the thickness of the circumferential wall 140 can be any suitable dimension for the container made by the disclosed method. For example, as embodied herein the thickness of the circumferential wall 140 is about 0.018 inches, although the thickness generally can be between from about 0.005 to about 0.05 inches. The thickness of the circumferential wall 140 can be of generally uniform thickness about the circumference, for example varying in thickness by no more than 25%, or more preferably no more than 10%, or even more preferably no more than 5%.

As embodied herein, the diameter of the circumferential wall 140 can be any suitable dimension for the container of the disclosed subject matter, such as for a 9.75-ounce container, about 1.5 inches as embodied herein. For example, the diameter of the circumferential wall can be between from about 1 inches and about 10 inches, depending on the size and shape of the container. In accordance with the disclosed subject matter and as embodied herein, a perimeter flange 150 extends radially inward from the circumferential wall 140. The perimeter flange can extend radially inward any suitable distance, for example from about 0 to about 0.2 inches. A suitable distance for the perimeter flange to extend radially inward can depend on certain factors, such as the wall thickness, an intended demoiling process, an intended sealing process, an intended capping process, an intended palletization, among others. Further in accordance with the disclosed subject matter and as embodied herein, a pair of tabs 160 extend generally within a plane P defined by the perimeter flange 150 along the upper edge 141 of the circumferential wall 140, and are configured to define a directional pour spout therebetween for a fluid or flowable product. For example, and not limitation, the tabs 160 can be varied in size, shape, and relative location along the circumference to calibrate the spout 170 to have the desired effect for the intended product. That is, containers for use with different viscosity fluids can be calibrated differently from each other by altering the tab configuration.

For example, each of the tabs 160 can extend radially inward between about 1% and about 50% of the diameter of the circumferential wall. As embodied herein for purpose of illustration and not limitation, the tabs 160 each extend inward about 0.125 inches, or at least about 8% of the diameter, from the upper edge 141 of the circumferential wall 140. Further in accordance with the disclosed subject matter, and as embodied herein, each of the tabs 160 is arcuate in plan view. However, it is to be understood that the tabs can have any other suitable shape, such as trapezoidal, triangular, polygonal, or the like. Furthermore, the tabs 160 can extend radially inward from the perimeter flange 150 in a plane P defined by the perimeter flange.

As further embodied herein, the tabs 160 are spaced apart at least 10 degrees about the perimeter edge, although different spacing can be provided. For example, although the disclosed subject matter as illustrated in the accompanying figures only shows a pair of tabs 160, more than two tabs can be provided about the circumferential wall 140 if desired. For example, the circumferential wall can have three or more tabs to define a separate spout between each adjacent pair of tabs. Thus, the container of the disclosed subject matter can include more than one pouring feature (e.g., spout) at least partially defined by the numbers and shapes of the tabs. Such additional pouring features can, for example, provide alternative pouring angles for multi-directional dispensing of fluid or flowable product contents from the container.

Additionally, and in accordance with the disclosed subject matter, the finish portion 120 can be configured with a continuous, closed-loop planar surface. For example, and as depicted in the figures for illustration, the perimeter flange and pair of tabs together define a continuous planar surface. As embodied herein, the perimeter flange and pair of tabs can define a plane P parallel with a reference plane defined by the bottom support surface 111 of the main body portion 110 (e.g., the planar surface can be horizontal) as shown for purpose of illustration and not limitation in FIG. 10A. Alternatively, and in accordance with the disclosed subject matter, the planar surface can be disposed at an angle relative to the reference plane defined by the bottom support surface of the main body portion, as shown for purpose of illustration and not limitation in FIG. 10B. That is, the perimeter flange and tabs, or a lip edge thereon as described further below, can define a planar surface that extends in a plane angled (i.e., not parallel) with a reference plane defined by the bottom support surface 111 of the main body portion 110. As such, and as will be described in further detail below, the perimeter flange 150 and the pair of tabs 160 can enable features that require a planar surface, such as application of an induction seal, foil seal, membrane seal, or the like. Generally, induction seals produce superior sealing effects as compared to conventional seals such as foam liners. In accordance with the disclosed subject matter, the container can thus be provided with a finish portion that has both a directional pouring feature and a seal capability.

The inner edge of the pair of tabs 160 and the perimeter flange 150 can form a perimeter edge 151 to define the mouth 130 of the finish portion 120. The pair of tabs 160 thus direct fluid or flowable contents through the spout portion 170 when the container is tilted. Furthermore, the tabs 160 can be configured to funnel fluid or flowable product toward the spout as needed. That is, even if the level of fluid or flowable product content exceeds the height of the pair of tabs 160, the fluid or flowable product content can be pulled to the spout portion 170 because the flow velocity in the spout portion is higher than that of the fluid or flowable product content flowing over the tabs 160. This differential velocity can maintain a consistent pour stream even when the bottle is tilted at higher pour angles.

As embodied herein, the finish portion 120 can be configured such that any fluid or flowable product in the plastic container 100 will be dispensed in a directional manner. Advantageously, the spout 170 is unitary with the container, avoiding a need for a separate spout portion, or a more complex and costly process to reform geometry. As embodied herein, no separate spout portion is needed for manufacturing or assembly of the plastic container 100, and the geometry of the spout portion 170 can be molded simultaneously with the remainder of the container. This design can reduce the complexity and costs of manufacturing the plastic bottle and potentially reduces the likelihood of leakage because no seam is formed between the single piece spout 170 and finish portion 120.

As previously noted, and in accordance with the disclosed subject matter, the blow-molded plastic container is made from a hollow blow-molded article comprising the main body portion and the finish portion as previously set forth. That is, the finish portion includes a substantially cylindrical circumferential wall of generally uniform thickness surrounding the mouth, the circumferential wall has an upper edge with a perimeter flange and a pair of tabs projecting radially inward from the circumferential wall, and the pair of tabs defines a spout therebetween. The hollow blow-molded article further comprises a moil portion extending from the perimeter flange in a direction opposite the main body portion. The method thus comprises removing the moil portion from the perimeter flange as described further below.

Figure 5:
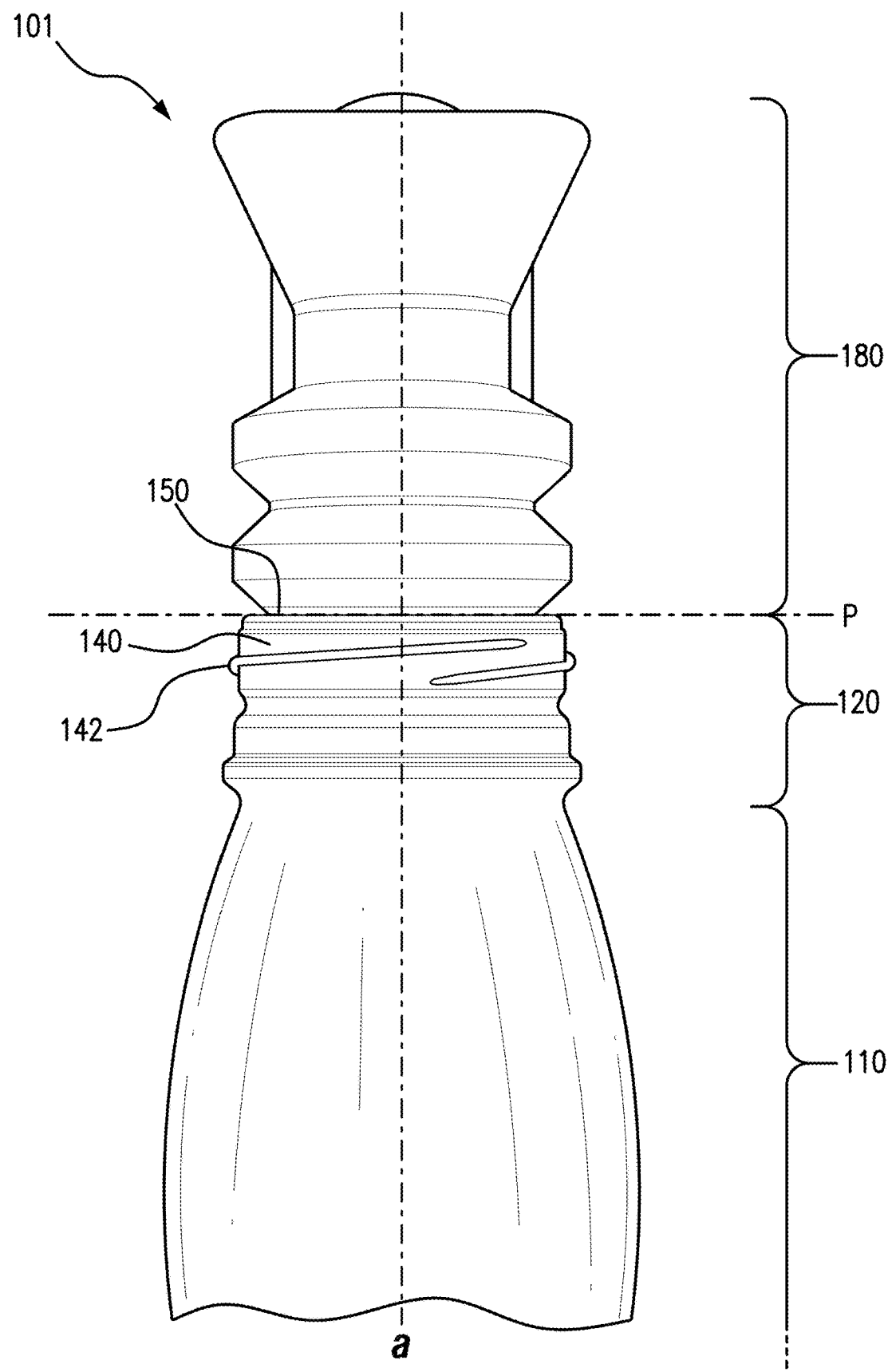
FIG. 5 is an enlarged top front view of an exemplary hollow blow-molded article for making a plastic container in accordance with the disclosed subject matter.
Figure 6:
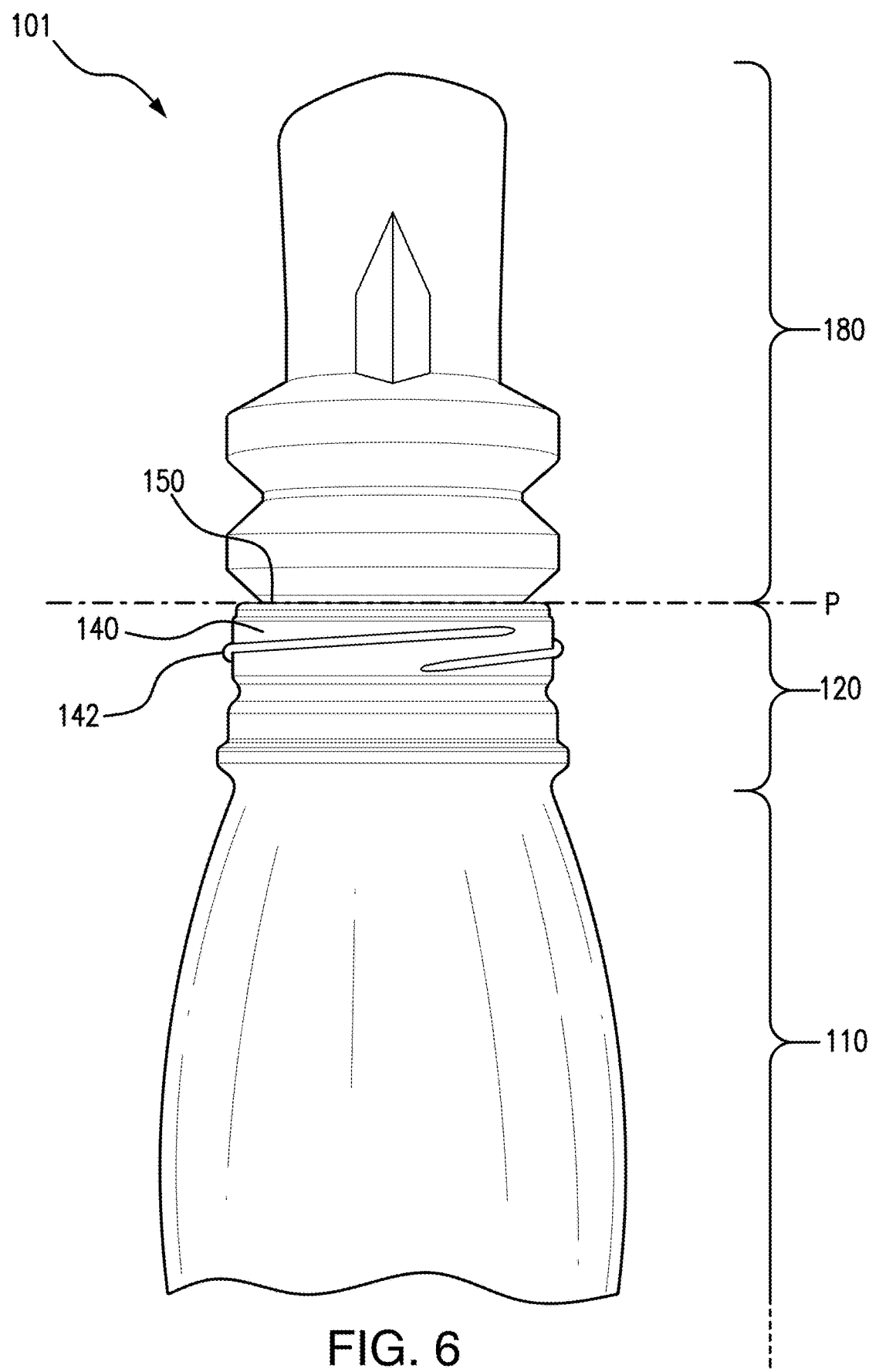
FIG. 6 is an enlarged side view of the exemplary hollow blow-molded article of FIG. 5 in accordance with the disclosed subject matter.
Figure 7:
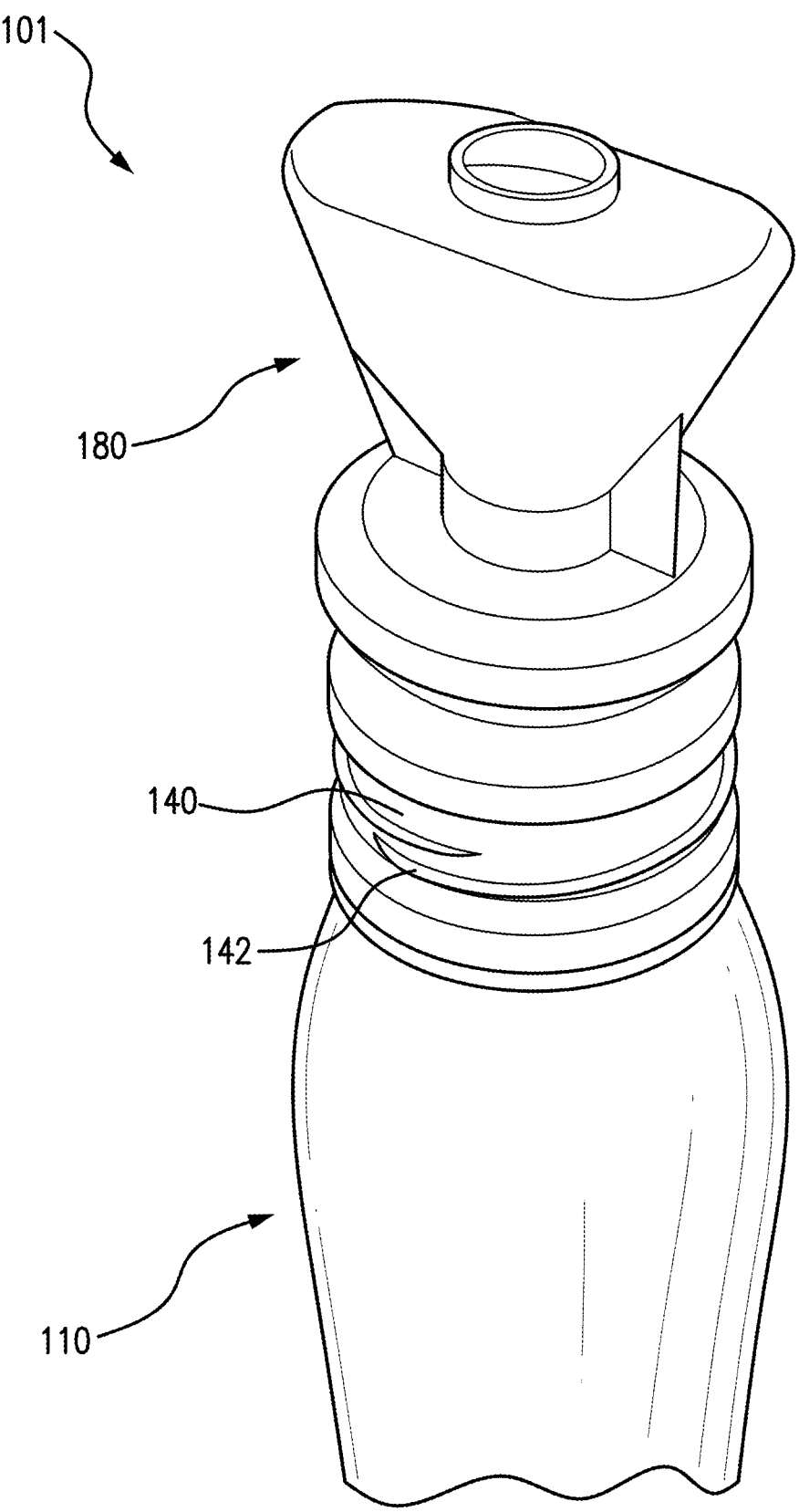
FIG. 7 is an enlarged top perspective view of the hollow blow-molded article of FIG. 5 in accordance with the disclosed subject matter.

For purpose of illustration and not limitation, reference is made to FIGS. 5-7, which show the hollow blow-molded article comprises a moil portion 180 extending from the perimeter flange 150 in a direction opposite the main body portion 110. The perimeter flange 150 and the pair of tabs 160 define a plane P, as set forth above. As embodied herein, the container 100 is made from the hollow blow-molded article 101 by removing the moil portion 180 from the perimeter flange 150. Further in accordance with the disclosed subject matter, the moil portion can be of any suitable size and shape. As will be understood by one of skill in the art, in accordance with the disclosed subject matter, a moil portion of the hollow blow-molded article can be connected to the moil portion of another hollow blow-molded article, such that two hollow blow-molded articles are blow-molded together. Alternatively, two or more blow-molded containers can be formed connected to a single moil portion with corresponding finish and main body portions extending therefrom.

Figure 9:
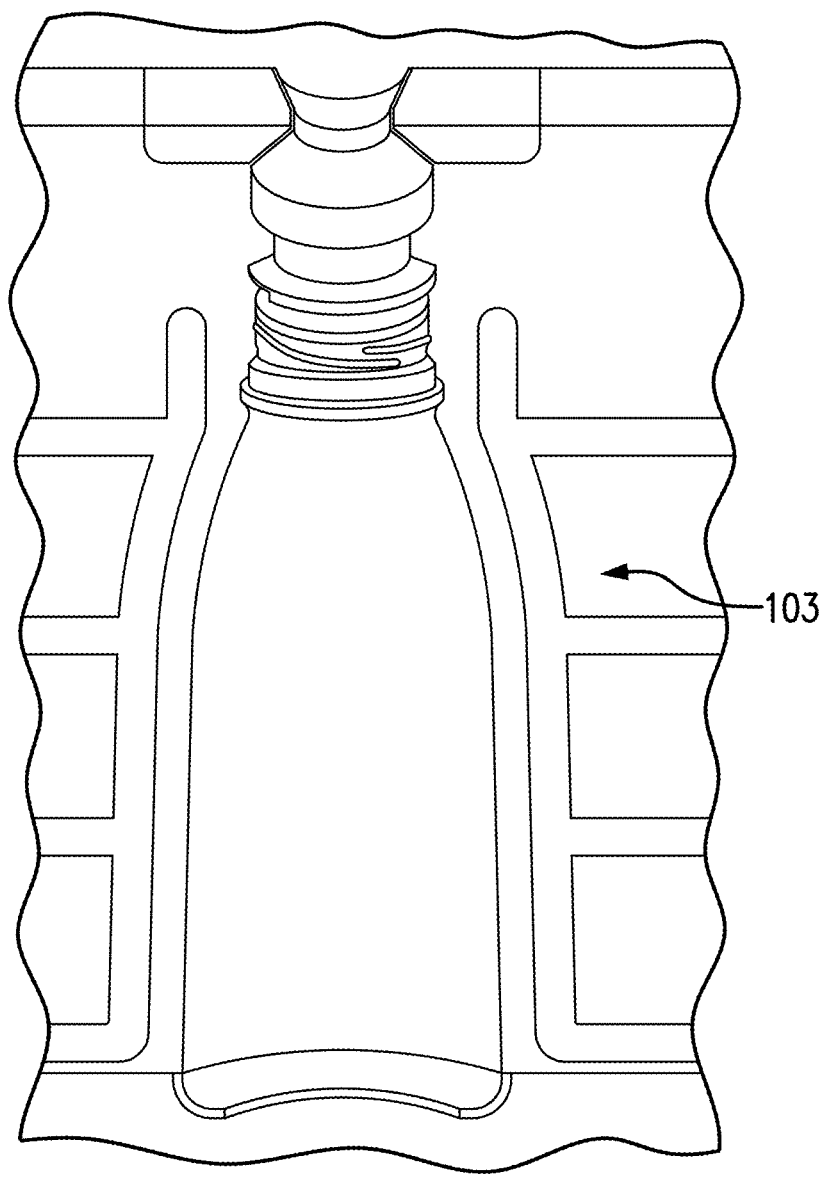
FIG. 9 is a schematic side view of mold cavity used in accordance with the disclosed subject matter.

A schematic image of an exemplary mold component is provided in FIG. 9, for purpose of illustration and not limitation, and as described further below. Generally, the mold cavity is formed of two or more mold components which, when assembled together, define the mold cavity with a surface corresponding to the outer surface of the article to be formed. Any plastic material suitable for a blow molding process can be used, including, for example, a monolayer plastic material. A monolayer plastic material can include, for example and not limitation: a polyamide, for example, nylon; a polyolefin such as polyethylene, for example, low density polyethylene (LDPE) or high density polyethylene (HDPE), or polypropylene; a polyester, for example polyethylene terephthalate (PET), polyethylene naphtalate (PEN); or others, which can also include additives to vary the physical or chemical properties of the material. For example, some plastic resins can be modified to improve the oxygen permeability. Alternatively, the container can be prepared from a multilayer plastic material. The layers can be any plastic material, including one or more of virgin, recycled and reground material, and can include plastics or other materials with additives to improve physical properties of the container. In addition to the above-mentioned materials, other materials often used in multilayer plastic containers, and suitable for use in the blow molding process of the presently disclosed subject matter include, for example, ethylvinyl alcohol (EVOH) and tie layers or binders to hold together materials that are subject to delamination when used in adjacent layers. Additionally, or alternatively, a coating may be applied over the monolayer or multilayer material, for example to introduce oxygen barrier properties.

The plastic material, such as a tube or parison, is disposed within the mold cavity at appropriate temperature and pressure parameters, as known in the art, and inflated to form the hollow article. After blow-molding of the plastic material is complete to form the hollow blow-molded article, and with reference to FIG. 9 for purpose of illustration and not limitation, after the hollow blow-molded article 101 is formed, the mold components 103 are separated to release the hollow article 101 from the mold. Alternative mold assemblies are known and can be used for blow molding the hollow article having the configuration as disclosed.

Before or after releasing the hollow article from the mold cavity, the moil is removed from the finish portion. As disclosed herein, removing the moil portion 180 can include, for example, rotational cutting, reciprocal cutting, trimming, hot cutting, or laser cutting, among other ways known in the art. For example, and as embodied herein, removing the moil portion 180 can comprise cutting between the perimeter flange 150 and the moil portion 180 along a plane P defined by the perimeter flange, such as depicted in FIG. 5. To facilitate cutting, for example and not limitation, the hollow blow-molded article 101 can be placed into contact with a cutting instrument and rotated with respect thereto, or vice versa.

Figure 10A:
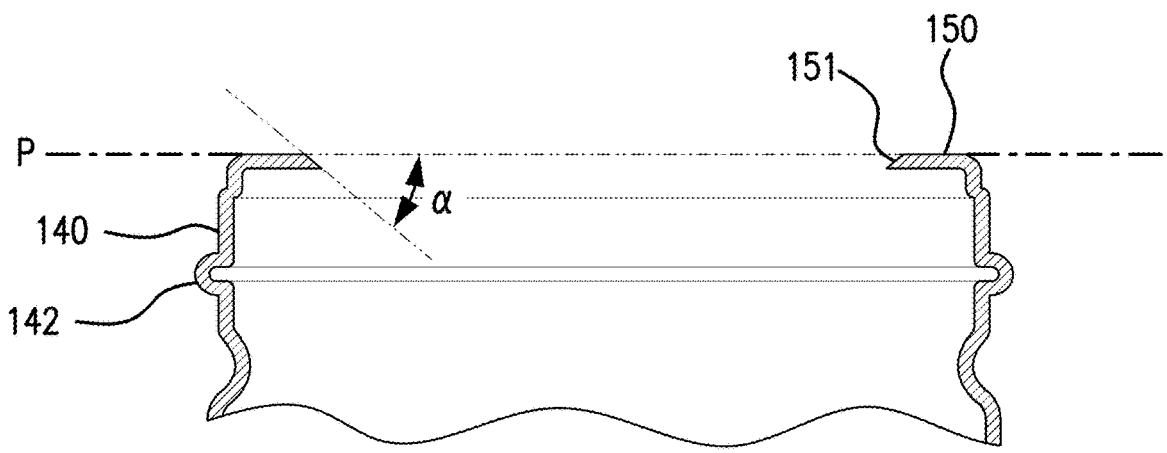
FIG. 10A is an enlarged cross-sectional detailed view of the finish portion of an exemplary container having a perimeter edge with a bevel angled from plane defined by the perimeter flange in accordance with the disclosed subject matter.
Figure 10B:
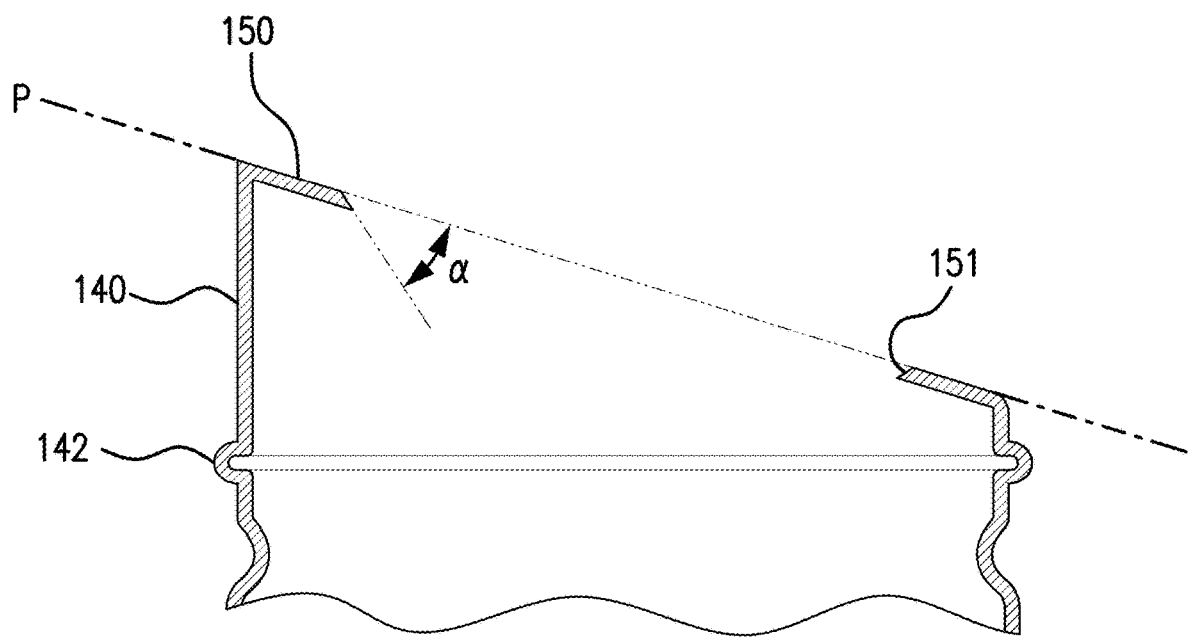
FIG. 10B is an enlarged cross-sectional detailed view of the finish portion of an exemplary container having a perimeter flange defining a plane angled relative to a reference plane defined by the bottom support surface of the main body portion in accordance with the disclosed subject matter.

Additionally, or alternatively, and in accordance with another aspect of the disclosed subject matter, removing the moil portion 180 can comprise cutting between the perimeter flange 150 and the moil portion 180 to form a beveled perimeter edge 151 having an angle $\alpha$ between about 0 and about 10 degrees from a plane P defined by the perimeter flange 150, as shown in FIG. 10A. Forming a beveled perimeter edge 151 having a bevel angled between about 0 degrees and about 10 degrees from plane P defined by the perimeter flange 150 can provide certain benefits. For example, the beveled perimeter edge 151 can reduce surface tension and forces on the fluid or flowable product to enhance flow through the mouth portion 130 generally and the spout 170 specifically. Furthermore, the bevel of the perimeter edge 151 can ensure that excess product does not flow down the exterior of the spout 170 during or after dispensing fluid or flowable product from the container. Additionally, or alternatively, the bevel of the perimeter edge 151 can provide a discrete sealing surface for the induction seal or the like, as described further below.

Figure 8:
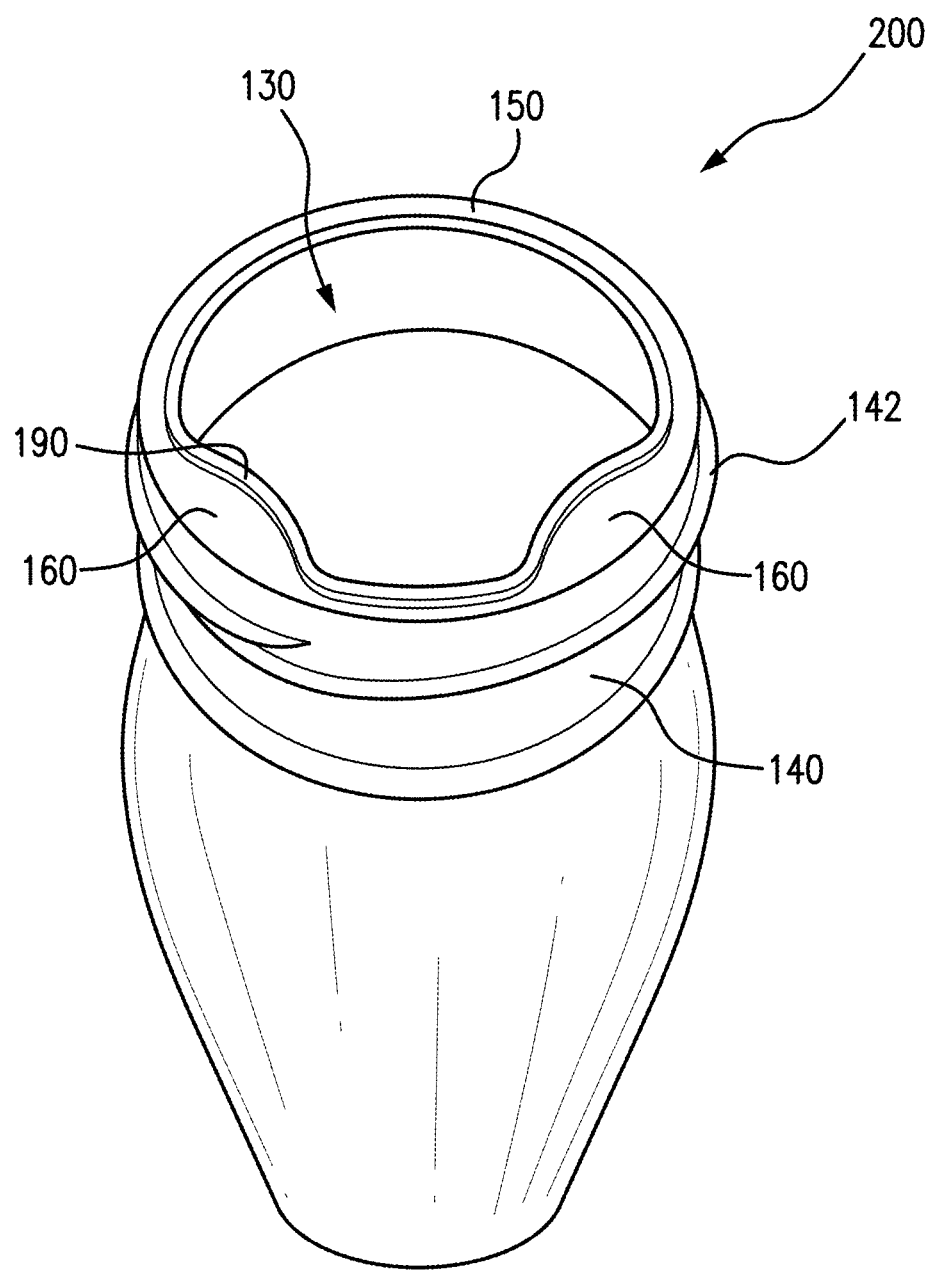
FIG. 8 is a top perspective view of another exemplary plastic container made in accordance with the disclosed subject matter, wherein the finish portion further includes a lip.
Figure 10C:
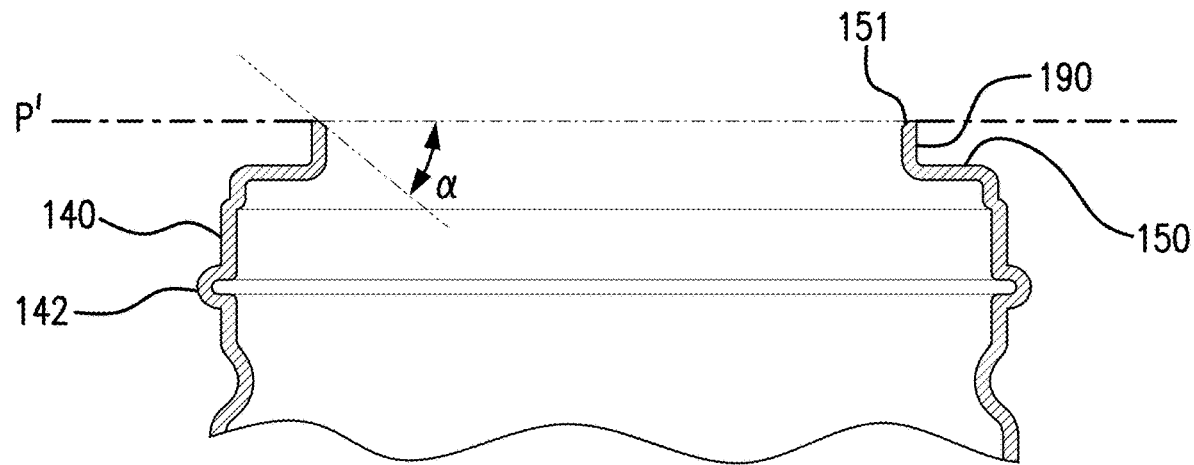
FIG. 10C is an enlarged cross-sectional detailed view of the finish portion of an exemplary container having a lip with a bevel angled from a plane defined by the planar perimeter edge in accordance with the disclosed subject matter.
Figure 10D:
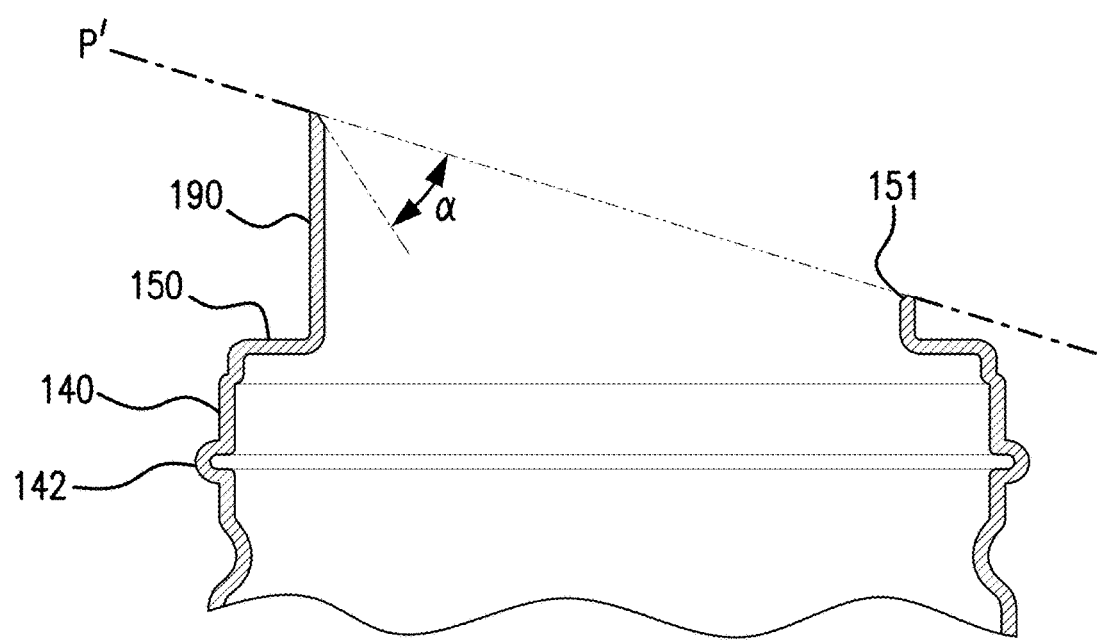
FIG. 10D is an enlarged cross-sectional detailed view of the finish portion of an exemplary container having a lip with a planar perimeter edge defining a plane angled relative to a plane defined by the bottom support surface of the main body portion in accordance with the disclosed subject matter.

In accordance with another aspect of the disclosed subject matter, and with reference to FIG. 8, for purpose of illustration and not limitation, the container 200 and method herein can include providing a lip 190 along the pair of tabs 160 and/or perimeter flange 150. That is, a lip 190 can extend upwardly from the tabs 160 and perimeter flange 150 in a direction opposite the main body portion. As embodied herein, the method of making container 200 can include removing the moil by cutting between the lip and the moil along a plane to define a planar perimeter edge of the lip. For example, and as shown in FIG. 10C for purpose of illustration and not limitation, removing the moil portion 180 can include cutting along a plane P' parallel to the plane defined by the perimeter flange at a distance spaced from the perimeter flange 150 in the direction opposite the main body portion 110 to create a lip 190 extending upwardly from the perimeter flange 150 and/or the pair of tabs 160. Alternatively, and as shown for purpose of illustration and not limitation in FIG. 10D, removing the moil portion 180 can comprise cutting between the perimeter flange 150 and the moil portion 180 at an angle relative to the plane defined by the perimeter flange to form a lip having a planar perimeter edge angled relative to the perimeter flange. Furthermore, the method disclosed herein can comprise removing the moil by cutting between the lip and the moil portion to form the perimeter edge of the lip with a bevel angled between about 0 and about 10 degrees from a plane defined by the planar perimeter edge of the lip. For example, as shown for purpose of illustration and not limitation in FIG. 10C, the perimeter edge 151 can have a bevel angled relative to the plane P'. As used herein, upwardly refers to a direction opposite the main body portion, but is not limited to a vertical direction. That is, the lip can be angled or arcuate relative to the perimeter flange.

Figure 11:
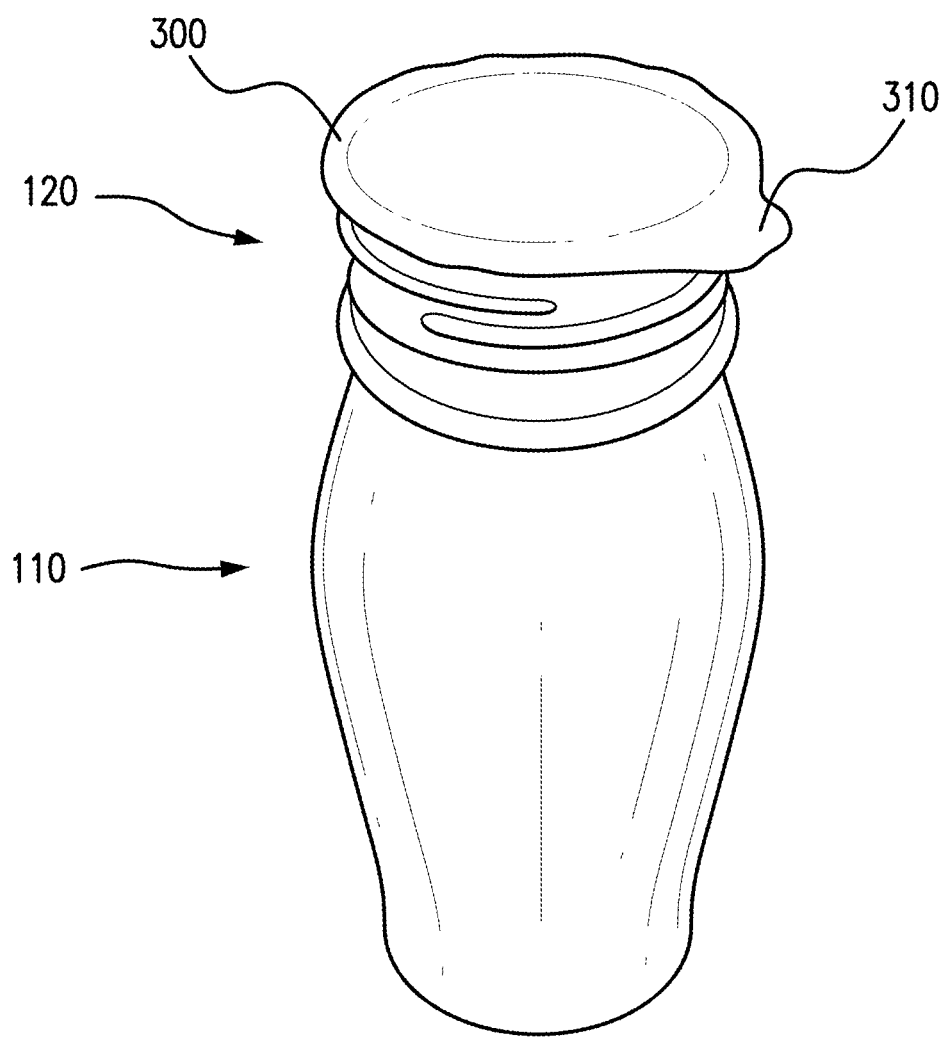
FIG. 11 is a top perspective view of an exemplary plastic container made from a hollow blow-molded article in accordance with the disclosed subject matter, with an induction seal affixed to a planar surface or edge of the finish portion.

In accordance with another aspect of the disclosed subject matter, and with reference to FIG. 11 for purpose of illustration and not limitation, finish portion 120 can further include a suitable seal 300, such as a foil seal, an induction seal, or the like. Traditionally, such a seal cannot be used with a standard spout, which has a contoured or nonplanar top surface. By contrast, a seal 300 or the like can be supported by the continuous, closed-loop planar surface formed by the perimeter flange 150 and the pair of tabs 160, and/or by the planar perimeter edge of the lip, as previously described. FIG. 11 depicts, for purpose of illustration and not limitation, an exemplary finish portion 120 of the plastic container of FIG. 1, having a planar seal 300 affixed to the top surface. In this manner, a seal can be used rather than a traditional compression foam cap liner. The rim of the seal 300 can be aligned with or extend beyond the upper edge 141 of the upper portion 120. That is, for purpose of illustration not limitation, the induction seal 300 can extend beyond the upper edge to define a grab area or tab 310 for the easy removal of the seal 300 as described. A person of ordinary skill in the art will appreciate that, although not depicted, containers having a lip with a planar perimeter edge such as depicted in FIGS. 9, 10C, and/or 10D can include a seal similar to that of FIG. 11. As a result, the disclosed subject matter provides a finish portion with a unitary spout portion having a generally planar top surface or edge suitable for applying seals, thereby providing a robust seal.

In accordance with the embodiments of the subject matter previously described, the components of the seal 300 can be made from any suitable material, and the seal 300 can be affixed to the container 100 by any suitable means. For example, the seal 300 can be formed of suitable paper, foil, polymer film, or a combination thereof. Furthermore, seal 300 can be affixed for example to the planar surface on the finish portion using induction sealing, glue sealing, or other known methods.

In accordance with another aspect of the disclosed subject matter, the circumferential wall 140 of the finish portion 120 can comprise a fastener 142. For example, the fastener 142 can comprise one or more of a thread, groove, protrusion, or other suitable fastener known in the art. Furthermore, the fastener 142 can be provided with a variety of configurations, such as interrupted or continuous threads, grooves, protrusions, or the like. For example, for purpose of illustration and not limitation, threads can be provided having a helical configuration to allow engagement with a corresponding inner thread. The fastener 142 thus can provide a surface or feature for fitting or attaching one or more additional components to the finish portion 110. For example, and as embodied herein, the fastener 142 can provide a surface for fitting or attaching a rigid or semi-rigid cap (not shown) to the finish portion 110 to allow for transportation of the container 100 without damage to a seal. As such, the cap can provide a secondary barrier to the seal, e.g., during shipping, and can be replaced on the container after initial use to provide a closure after a consumer removes the seal. Alternatively, fastener 142 can provide a surface for fitting any number of known components to the finish portion 140, including for example, dosage cups or the like. A person of ordinary skill in the art would appreciate that any existing caps in the art that are used with conventional containers can be used with the spout design with directional pour in the disclosed subject matter, without limitation.

In accordance with another aspect of the disclosed subject matter, the disclosed subject matter includes methods of making the plastic container as described above. The method of the disclosed subject matter comprises disposing a plastic material suitable for a blow molding process within a mold cavity configured to form a hollow article comprising a main body portion defining an interior space, a finish portion defining a mouth in fluid communication with the interior space, the finish portion having a substantially cylindrical circumferential wall of generally uniform thickness surrounding the mouth, the circumferential wall having an upper edge with a perimeter flange and a pair of tabs projecting radially inward from the circumferential wall, the pair of tabs defining a spout therebetween, and a moil portion extending from the perimeter flange in a direction opposite the main body portion, inflating the plastic material within the mold cavity to form the hollow article, and removing the moil portion from the perimeter flange.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the devices of the disclosed subject matter without departing from the spirit or scope of the disclosed subject matter. Thus, it is intended that the disclosed subject matter include modifications and variations that are within the scope of the appended claims and their equivalents.

What is claimed is:

1. A method of making a blow-molded plastic container, comprising:
    disposing a plastic material suitable for a blow molding process within a mold cavity configured to form a hollow article comprising:
        a main body portion defining an interior space,
        a finish portion defining a mouth in fluid communication with the interior space, the finish portion having a substantially cylindrical circumferential wall of generally uniform thickness surrounding the mouth, the circumferential wall having an upper edge with a perimeter flange and a pair of tabs projecting radially inward from the circumferential wall, the perimeter flange and the pair of tabs together defining a continuous planar surface along the upper edge, the pair of tabs defining a spout therebetween, and
        a moil portion extending from the perimeter flange in a direction opposite the main body portion;
    inflating the plastic material within the mold cavity to form the hollow article; and
    removing the moil portion from the perimeter flange by cutting between the perimeter flange and the moil portion to form a perimeter edge having a bevel angled between about 0 and about 10 degrees from the planar surface defined by the perimeter flange and the pair of tabs.

2. The method of claim 1, wherein the tabs are arcuate in plan view.

3. The method of claim 1, wherein the tabs are spaced apart at least 10 degrees about the perimeter edge.

4. The method of claim 1, wherein removing the moil portion further comprises cutting a distance spaced from the perimeter flange in the direction opposite the main body portion to create a lip extending upwardly from the perimeter flange and the pair of tabs.

5. A method of making a blow-molded plastic container, comprising:
    disposing a plastic material suitable for a blow molding process within a mold cavity configured to form a hollow article comprising:
        a main body portion defining an interior space,
        a finish portion defining a mouth in fluid communication with the interior space, the finish portion having a substantially cylindrical circumferential wall of generally uniform thickness surrounding the mouth, the circumferential wall having an upper edge with a perimeter flange and a pair of tabs projecting radially inward from the circumferential wall, the perimeter flange and the pair of tabs together defining a continuous planar surface along the upper edge, the pair of tabs defining a spout therebetween, and
        a moil extending from the perimeter flange in a direction opposite the main body portion,
    inflating the plastic material within the mold cavity to form the hollow article, and
    removing the moil from the perimeter flange by cutting a distance spaced from the perimeter flange in the direction opposite the main body portion to create a lip extending upwardly from the perimeter flange and the pair of tabs.

6. The method of claim 5, wherein removing the moil comprises cutting between the lip and the moil along a plane to define a planar perimeter edge of the lip.

7. The method of claim 6, wherein removing the moil comprises cutting between the lip and the moil portion to form the planar perimeter edge with a bevel angled between about 0 and about 10 degrees from the plane defined by the planar perimeter edge.

8. The method of claim 1, wherein the circumferential wall comprises a fastener for fastening a cap to the finish portion.

* * * * *